United States Patent
Nakhjavani et al.

(10) Patent No.: US 11,854,383 B2
(45) Date of Patent: Dec. 26, 2023

(54) AUXILIARY POWER UNIT STARTUP CONDITION PREDICTION

(71) Applicant: THE BOEING COMPANY, Chicago, IL (US)

(72) Inventors: Omid B. Nakhjavani, Kirkland, WA (US); Shervin Beygi, Seattle, WA (US); Allen Lee, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 567 days.

(21) Appl. No.: 16/428,768

(22) Filed: May 31, 2019

(65) Prior Publication Data
US 2020/0380804 A1 Dec. 3, 2020

(51) Int. Cl.
*G08G 5/00* (2006.01)
*G07C 5/08* (2006.01)
(Continued)

(52) U.S. Cl.
CPC ........... *G08G 5/0013* (2013.01); *B64D 33/02* (2013.01); *G01W 1/10* (2013.01); *G06F 18/24* (2023.01); *G06N 20/00* (2019.01); *G07C 5/008* (2013.01); *G07C 5/0816* (2013.01); *G08G 5/003* (2013.01); *B64D 2033/0213* (2013.01); *B64D 2033/0233* (2013.01)

(58) Field of Classification Search
CPC ...... G07C 5/0816; G07C 5/008; G07C 5/006; B64D 33/02; B64D 2033/0213; B64D 2033/0233; G01W 1/10; G06K 9/6267; G06K 9/6288; G06N 20/00; G08G 5/003; G08G 5/0026; G08G 5/0043; G08G 5/0082; G08G 5/0091; G08G 5/065; G08G 5/0013

USPC .......................................................... 701/13
See application file for complete search history.

(56) References Cited

U.S. PATENT DOCUMENTS 6,296,957 B1 10/2001 Graage
7,702,435 B2 * 4/2010 Pereira ................ H04L 41/0853
701/30.8
(Continued)

FOREIGN PATENT DOCUMENTS

EP          2323005 B1      11/2016
WO      2015029332 A2       3/2015

OTHER PUBLICATIONS

Eduardo Moreno Gallart, Design of Auxiliary Power Unit (APU) for co-operation with a turboshaft engine, Technical University of Lodz, International Faculty of Engineering Institute of Turbomachinery Lodz, 2013. (Year : 2013).

*Primary Examiner* — Maceeh Anwari
(74) *Attorney, Agent, or Firm* — Moore Intellectual Property Law, PLLC

(57) ABSTRACT

A system to predict a startup condition of an auxiliary power unit (APU) of an aircraft includes a machine learning device configured to receive data including sensor data of the aircraft and weather forecast data of a destination airport. The machine learning device is also configured to process the data to generate a prediction regarding the startup condition and to generate a message based on the prediction. The message indicates that an alternate startup procedure of the APU is to be performed after the aircraft has landed at the destination airport to avoid an error condition associated with a primary startup procedure of the APU.

20 Claims, 4 Drawing Sheets

(51) Int. Cl.
  *G07C 5/00*    (2006.01)
  *B64D 33/02*   (2006.01)
  *G06N 20/00*   (2019.01)
  *G01W 1/10*    (2006.01)
  *G06F 18/24*   (2023.01)

(56) References Cited

U.S. PATENT DOCUMENTS

| | | |
|---|---|---|
| 8,444,093 B1 | 5/2013 | Epstein |
| 2006/0126608 A1 | 6/2006 | Pereira et al. |
| 2012/0041627 A1 | 2/2012 | Kelty et al. |
| 2014/0203136 A1 | 7/2014 | Endres |
| 2015/0158397 A1 | 6/2015 | Soto et al. |
| 2015/0279218 A1* | 10/2015 | Irrgang ................ G08G 5/0056 701/3 |
| 2016/0111885 A1 | 4/2016 | Roques et al. |
| 2016/0181641 A1 | 6/2016 | Hoffjann et al. |
| 2016/0264252 A1 | 9/2016 | Rideau |
| 2018/0126851 A1 | 5/2018 | Koebler et al. |
| 2019/0283600 A1 | 9/2019 | Koebler et al. |
| 2020/0277080 A1 | 9/2020 | Wiegman |
| 2021/0334675 A1 | 10/2021 | Nakhjavani |

\* cited by examiner

AUXILIARY POWER UNIT STARTUP CONDITION PREDICTION

FIELD OF THE DISCLOSURE

The present disclosure is generally related to auxiliary power units.

BACKGROUND

Commercial aircraft typically include an auxiliary power unit (APU) to provide electrical power to aircraft systems independently of operation of the aircraft's main engines. The APU is often operated to provide electrical power while the aircraft is on the ground and the main engines are off.

In some environmental conditions, startup of an APU while the aircraft on the ground can result in an error condition even though there are no mechanical or electrical failures of individual APU components. To illustrate, under certain conditions, condensation and freezing of atmospheric humidity can occur upon contact with the APU during a descent phase or upon landing of the aircraft, resulting in a thin layer of ice forming prior to the APU warming to an ambient temperature at the destination airport. Although such icing is a transient condition that only rarely occurs and only under certain circumstances, the icing can interfere with normal startup of the APU and trigger an error condition.

An error condition related to APU startup must be resolved prior to resuming flight operations. Unfortunately, not all airports have mechanics that can accurately troubleshoot the described error condition as due to a transient icing condition rather than due to an actual mechanical or electrical failure of APU components, leading to extended delays and customer dissatisfaction. For example, a maintenance crew can attempt to respond to the error condition by replacing parts that have not failed, incurring costs and delays.

SUMMARY

In a particular implementation, a system to predict a startup condition of an auxiliary power unit (APU) of an aircraft includes a machine learning device configured to receive data including sensor data of the aircraft and weather forecast data of a destination airport. The machine learning device is also configured to process the data to generate a prediction regarding the startup condition and to generate a message based on the prediction. The message indicates that an alternate startup procedure of the APU is to be performed after the aircraft has landed at the destination airport to avoid an error condition associated with a primary startup procedure of the APU.

In another particular implementation, a method to predict a startup condition of an auxiliary power unit (APU) of an aircraft includes receiving, at a machine learning device, data including sensor data of the aircraft and weather forecast data of a destination airport. The method includes processing, at the machine learning device, the data to generate a prediction regarding the startup condition. The method also includes sending, to at least one of: the aircraft or a maintenance system at the destination airport, a message based on the prediction and recommending use of an alternate startup procedure of the APU to avoid an error condition associated with a primary startup procedure of the APU.

In another particular implementation, a non-transitory, computer readable medium stores instructions that, when executed by a processor, cause the processor to initiate, perform, or control operations to predict a startup condition of an auxiliary power unit (APU) of an aircraft. The operations include receiving data including sensor data of the aircraft and weather forecast data of a destination airport. The operations include processing the data to generate a prediction regarding the startup condition. The operations also include sending, to at least one of: the aircraft or a maintenance system at the destination airport, a message based on the prediction and recommending use of an alternate startup procedure of the APU to avoid an error condition associated with a primary startup procedure of the APU.

The features, functions, and advantages described herein can be achieved independently in various implementations or may be combined in yet other implementations, further details of which can be found with reference to the following description and drawings.

DETAILED DESCRIPTION

Figure 1:
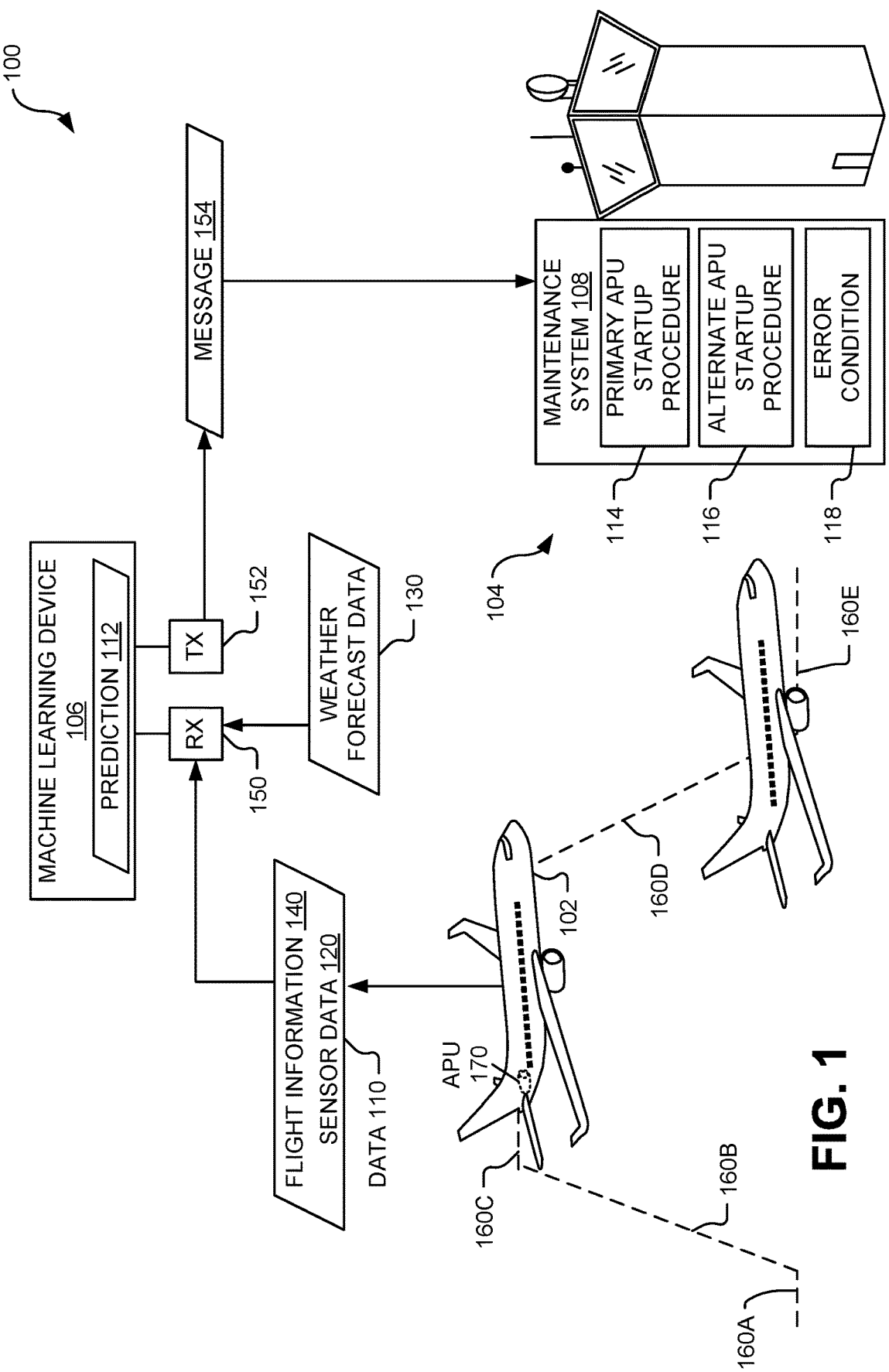
FIG. 1 is a diagram that illustrates a system configured to predict an APU startup condition.

Aspects disclosed herein present systems and methods for predicting a startup condition of an APU. For example, under particular conditions, a thin layer of ice can form on part of the APU upon landing of an aircraft at a destination airport. Although the ice rapidly dissipates as the APU warms to ambient temperature at the destination airport, startup of the APU after landing but before the ice has dissipated can result in an error condition. Attempts to identify and resolve the source of the error condition can result in unnecessary costs and delays.

Such unnecessary costs and delays are avoided by predicting a startup condition of the APU and, in response to predicting that an error condition will result upon performing an APU startup procedure, performing an alternative APU startup procedure. For example, the alternative APU startup procedure can include introducing a delay between landing at the destination airport and starting the APU. The delay can prevent the error condition by providing time for the APU to warm and dissipate any ice that may have formed.

Machine learning can be used to analyze data, such as airplane sensor data, destination airport weather forecast data, and flight information, to identify combinations of factors that are correlated with various error conditions. The identified factors can be used to predict occurrence of error conditions, such as predicting an error mode and a length of time after landing that the error mode is expected to occur. To illustrate, while the aircraft is in flight, available data can be processed and an alert can be provided to a flight crew of the airplane, a maintenance crew at the destination airport, or both, indicating that an alternative APU startup procedure is to be used after landing at the destination airport. Error modes can include, but are not limited to, errors due to transient icing as described above. Thus, costs and delays associated with encountering APU startup error conditions can be reduced or avoided.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple phases of a flight 160 are illustrated and associated with reference numbers 160A, 160B, 160C, 160D, and 160E. When referring to a particular one of these phases, such as a taxiing/takeoff phase 160A, the distinguishing letter "A" is used. However, when referring to any arbitrary one of these phases or to these phases as a group, the reference number 160 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to predict a startup condition of an auxiliary power unit (APU) 170 of an aircraft 102. Data corresponding to sensor data of the aircraft 102, flight information of the aircraft 102, and weather forecast data of a destination airport 104 are processed and, responsive to predicting an error condition 118 associated with a scheduled startup of the APU at the destination airport 104, a message 154 is provided to a maintenance system 108 at the destination airport 104. The message 154 indicates that an alternate APU startup procedure 116 for the APU 170 is to be used instead of a primary APU startup procedure 114. As a result, an error condition that was predicted to occur upon performing the primary APU startup procedure 114 can be avoided.

FIG. 1 illustrates representative portions of a flight path of the aircraft 102 to the destination airport 104. For example, the flight path includes a first phase (e.g., taxi/takeoff) 160A, a second phase (e.g., climb) 160B, a third phase (e.g., cruise) 160C, a fourth phase (e.g., descent) 160D, and a fifth phase (e.g., landing) 160E. The aircraft 102 is configured, during the third phase 160C of the flight 160 to the destination airport 104, to transmit data 110. For example, the data 110 includes sensor data 120 that can be transmitted to the system 100 for processing and determining whether the APU 170 is likely to experience the error condition 118 upon startup of the APU 170 after the aircraft 102 has arrived at the destination airport 104. In a particular implementation, the sensor data 120 is transmitted prior to the aircraft 102 beginning the fourth flight phase 160D. The sensor data 120 can include information regarding temperature or other conditions of the aircraft 102 or the APU 170. For example, the sensor data 120 can include an inlet temperature for the APU 170, an oil temperature of the APU 170, one or more other measurements, or a combination thereof. The data 110 can also include flight information 140 that indicates information related to usage of the APU 170 during the flight 160. For example, the flight information 140 can indicate a length of time between transitions of the APU 170 from an off state to an on state during the flight 160. Further detail with regard to the sensor data 120 and the flight information 140 are provided with reference to FIG. 2.

The system 100 includes a machine learning device 106 coupled to a receiver 150 and to a transmitter 152. The machine learning device 106 is configured to receive the data 110 including the sensor data 120 of the aircraft 102 and to receive the weather forecast data 130 of the destination airport 104. For example, the weather forecast data 130 can be transmitted from the destination airport 104 or can be generated by a weather forecasting service that can be remote from the destination airport 104. The weather forecast data 130 indicates one or more weather conditions that are forecast to be present at the destination airport 104 at the time of arrival of the aircraft 102. Examples of weather forecast data 130 are described further with reference to FIG. 2.

The data 110 further includes flight information 140 of the aircraft 102. In an example, the flight information 140 includes a flying time associated with one or more of the flight phases 160 of travel to the destination airport. In another example, the flight information 140 includes timing values of APU on/off events during one or more of the flight phases 160. The flight information 140 is described in further detail with reference to FIG. 2.

The machine learning device 106 is configured to process the data 110 to generate a prediction 112 regarding the startup condition. In some implementations, the machine learning device 106 is configured to generate the prediction 112 prior to an arrival of the aircraft 102 at the destination airport 104. The machine learning device 106 can include a classifier that is configured to process the data 110 and the weather forecast data 130 to generate an output that indicates whether or not the APU 170 is likely to exhibit the error condition 118 if the primary APU startup procedure 114 is performed upon arrival of the aircraft 102 at the destination airport 104. To illustrate, the machine learning device 106 generates the prediction 112, and the prediction 112 can indicate whether the error condition 118 is likely to result from the performance of the primary APU startup procedure 114. Alternatively, the prediction 112 can indicate that the alternate APU startup procedure 116 is to be performed. For example, the prediction 112 can estimate an amount of time after arrival at the destination airport 104 that startup of the APU 170 should be delayed to circumvent the error condition 118.

The machine learning device 106 is configured to generate a message 154 based on the prediction 112. The message 154 indicates that the alternate APU startup procedure 116 of the APU 170 is to be performed after the aircraft 102 has landed at the destination airport 104 to avoid an error condition 118 associated with a primary APU startup procedure 114 of the APU 170.

The receiver 150 is coupled to the machine learning device 106 and configured to receive the data 110 including the sensor data 120 and the flight information 140, and the weather forecast data 130. The transmitter 152 is coupled to the machine learning device 106 and configured to send the message 154 to one or both of: the aircraft 102; or a maintenance system 108 at the destination airport 104. Although the system 100 is illustrated as including the receiver 150 and the transmitter 152, in other implementations the system 100 includes one or more other implementations of a receive element and a transmit element. For example, a transceiver can be coupled to the machine learning device 106, and the transceiver can include the receiver 150 and the transmitter 152.

The message 154 can be transmitted to the aircraft 102 and can indicate an alert for a flight crew of the aircraft 102. The alert can provide an indication to the flight crew that, upon arrival at the destination airport 104, the primary APU startup procedure 114 is to be bypassed and instead the alternate APU startup procedure 116 is to be used. As another example, the message 154 is transmitted to the maintenance system 108 at the destination airport 104.

The maintenance system 108 can include one or more computers, interfaces, equipment, or a combination thereof. For example, the maintenance system 108 can include machinery configured to perform an external startup procedure of the APU 170. To illustrate, the primary APU startup procedure 114 can include performing a startup using systems aboard the aircraft 102 without use of external generators, supplies, or mechanical linkages to external devices such as a starter motor. The maintenance system 108 can include external equipment configured to enable an externally initiated startup of the APU 170. Alternatively, the alternate APU startup procedure 116 can include introducing a delay between arrival of the aircraft 102 at the destination airport 104 and initiating startup of the APU 170.

For example, in some implementations an icing condition can occur at a portion of the APU 170 as a result of the APU 170 having a low temperature resulting from a duration of the flight 160 during which the APU 170 was inactive, such as during the third phase 160C and the fourth phase 160D, which can cause condensation or freezing of atmospheric water vapor that comes into contact with APU components at the destination airport 104. The icing that can occur at the components of the APU 170 is a temporary condition caused by a flash freeze of atmospheric humidity coming into contact with cold components, and although the APU 170 has no mechanical, electrical, or other flaws, startup of the APU 170 can be impaired due to the temporary icing condition. As a result, delaying startup of the APU 170 provides sufficient time for any icing to dissipate, and therefore the error condition 118 does not occur.

During operation, data collection can begin when the aircraft 102 is airborne and before starting the descent phase 160D. Flight data, such as flight origin, destination, estimated flying time, etc., and sensor data 120, such as outside temperature, APU oil temperature, etc., are collected during the flight 160. In addition, the weather forecast data 130 at the destination airport 104 is collected. For example, the weather forecast data 130 can include temperature, relative humidity, dew point, air pressure, etc. The flight information 140, the sensor data 120, and the weather forecast data 130 are received at the receiver 150 and input to the machine learning device 106. The machine learning device 106 generates a prediction 112 that can predict an error probability and an error mode, in some implementations. The prediction 112 can be processed at the machine learning device 106 to generate the message 154 that is transmitted by the transmitter 152.

The message 154 can be an automated alert that uses rule-based logic to propose preventative or corrective actions. For example, a preventative or corrective action can be performed at the maintenance system 108 to use the alternate APU startup procedure 116 instead of the primary APU startup procedure 114 to avoid an occurrence of the error condition 118 associated with the primary APU startup procedure 114. As another example, the message 154 can be sent as an alert to the aircraft 102 to alert the flight crew or onboard systems of the aircraft 102 that, upon arrival at the destination airport 104, the primary APU startup procedure 114 is to be deviated from in favor of the alternate APU startup procedure 116.

The aircraft 102, the machine learning device 106, the receiver 150, the transmitter 152, and the maintenance system 108 are interconnected via one or more networks to enable data communications. For example, the machine learning device 106 is coupled to the maintenance system 108 via one or more wireless networks, one or more wireline networks, or any combination thereof. Two or more of the machine learning device 106, the receiver 150, the transmitter 152, and the maintenance system 108 can be co-located or geographically distributed from each other.

Figure 2:
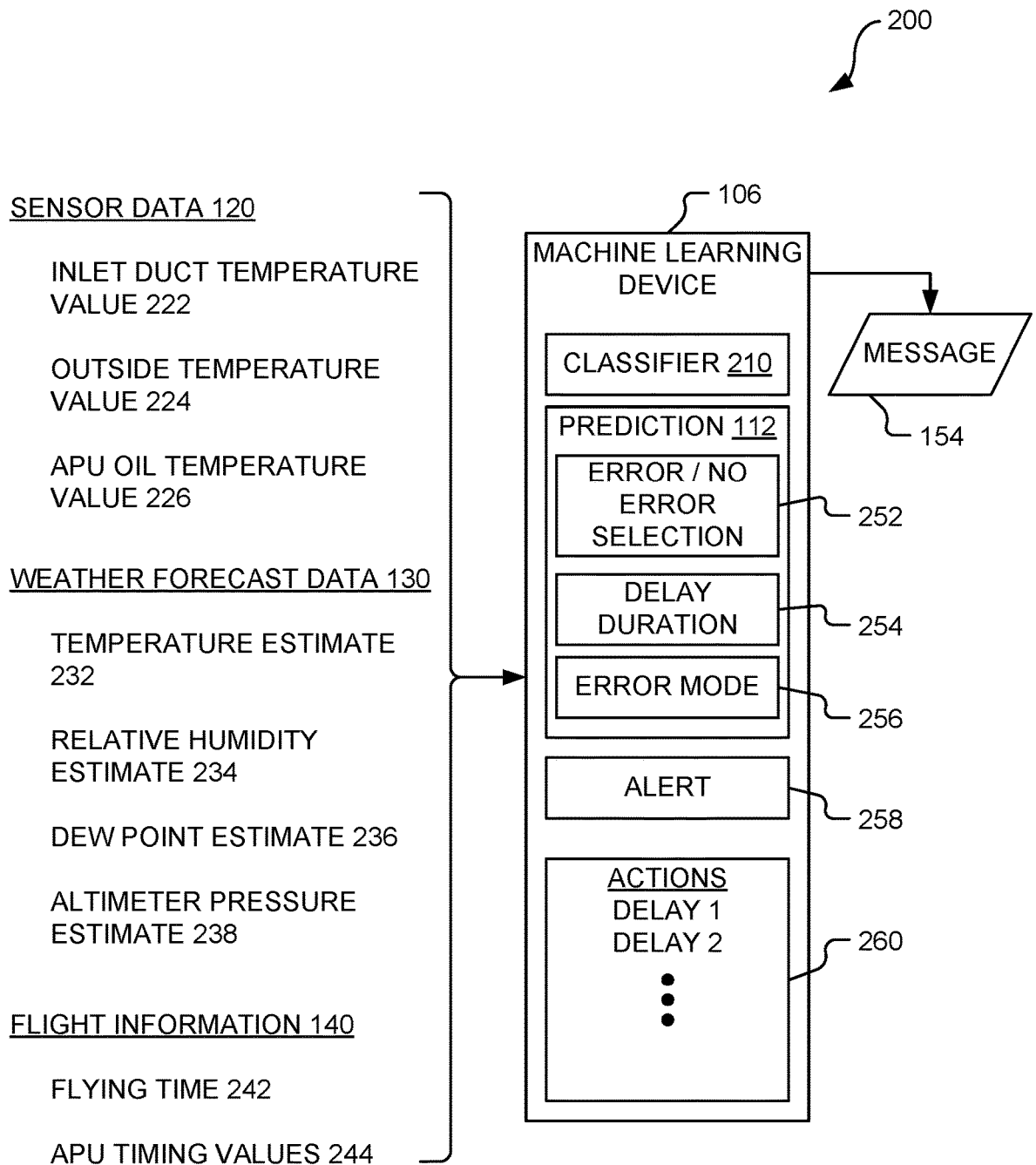
FIG. 2 is a diagram of a particular implementation of components that can be implemented in the system of FIG. 1.
Figure 3:
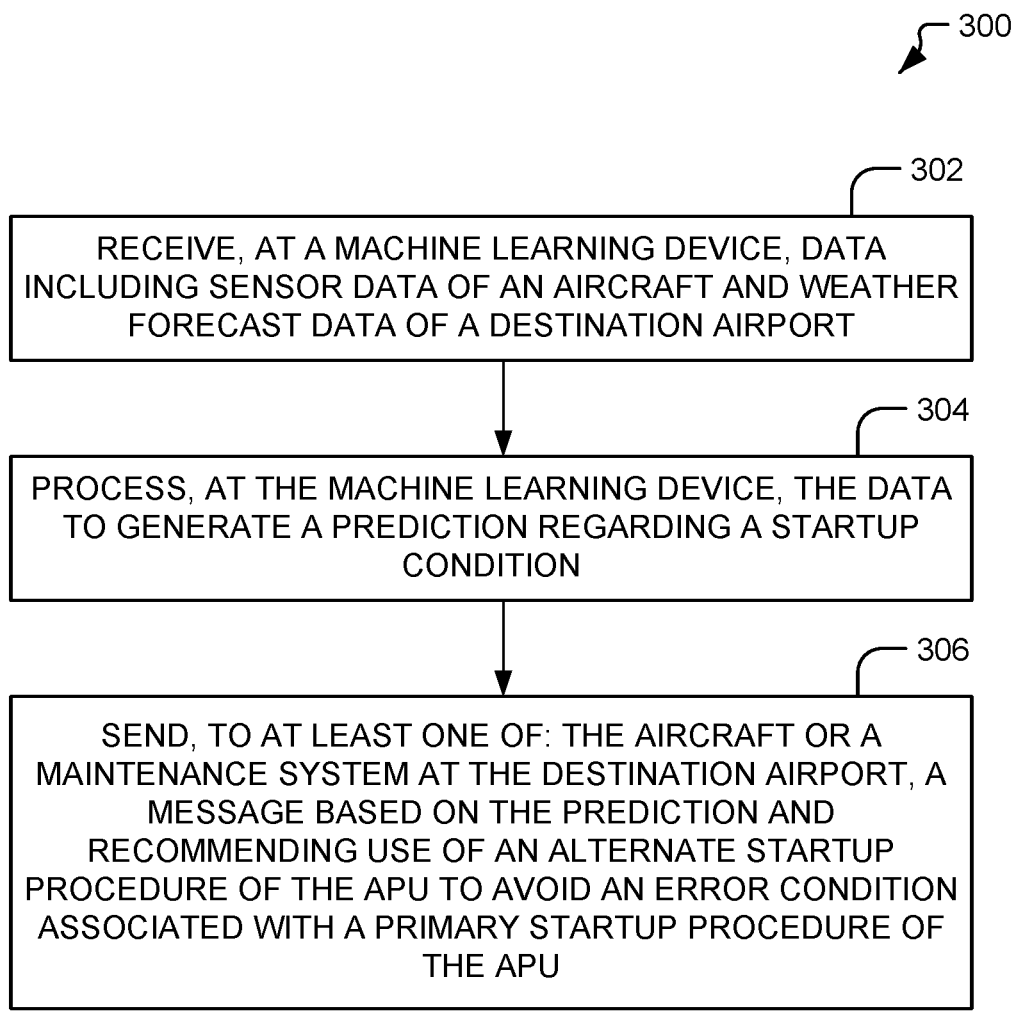
FIG. 3 is a diagram that illustrates a flow chart of an example of method of predicting an APU startup condition.
Figure 4:
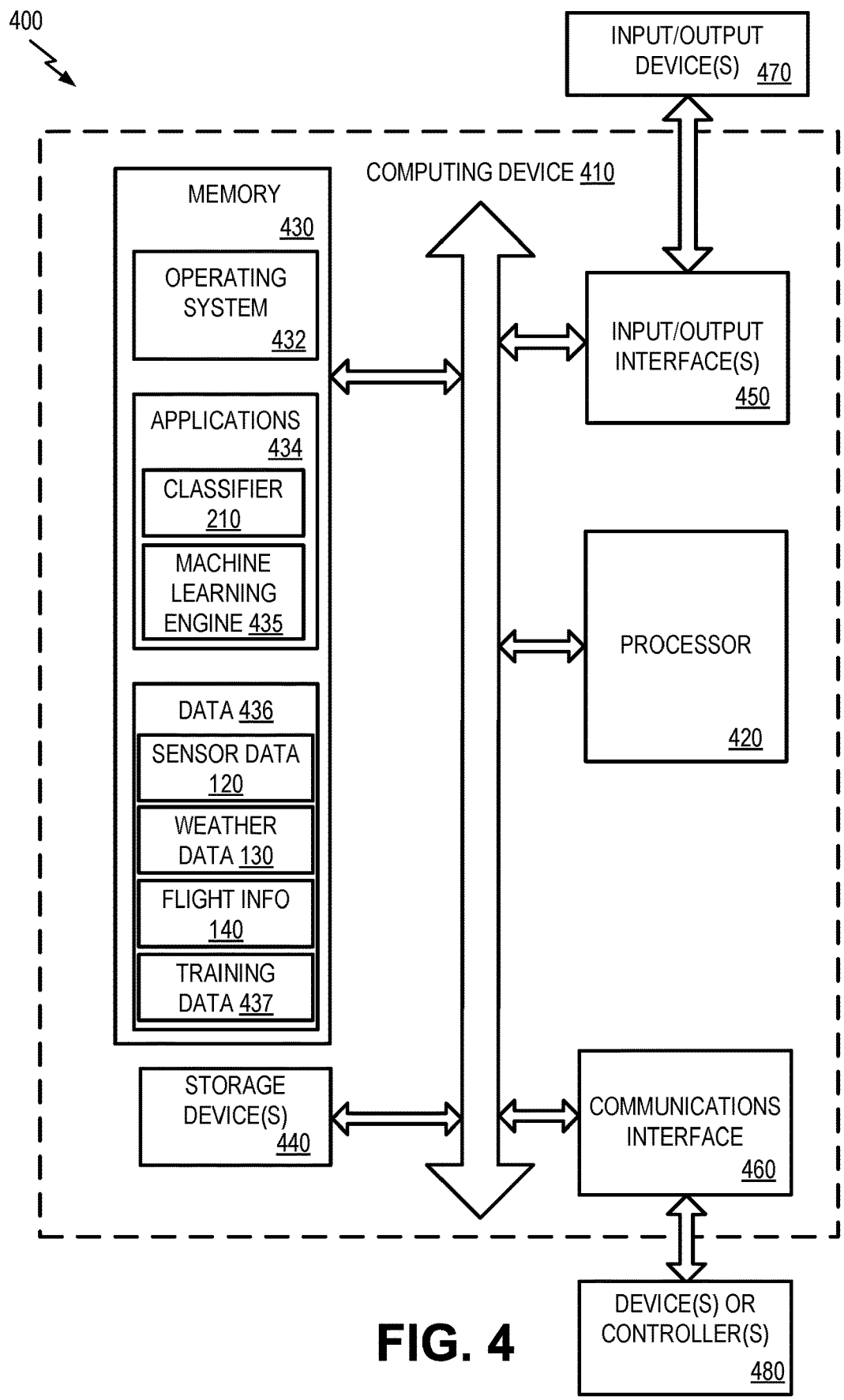
FIG. 4 is a block diagram of a computing environment including a computing device configured to support aspects of computer-implemented methods and computer-executable program instructions (or code) according to the present disclosure.

The machine learning device 106 can be implemented at least in part by a processor executing instructions to perform the described functions, as described further with reference to FIGS. 2-4. The processor of the machine learning device 106 can be implemented as a single processor or as multiple processors, such as in a multi-core configuration, a multi-processor configuration, a distributed computing configuration, a cloud computing configuration, or any combination thereof. In some implementations, one or more portions of the machine learning device 106 are implemented using dedicated hardware, firmware, or a combination thereof.

By preventing the error condition 118 from occurring, time and money associated with delaying the next flight of the aircraft 102 and/or switching out components of the APU 170 can be avoided. To illustrate, because the error condition 118 can be caused by a temporary icing condition which can be predicted based on the data 110 and the weather forecast data 130, the error condition 118 does not reliably indicate a failure of mechanical parts or systems of the aircraft 102. However, flight safety requirements can necessitate maintenance delays and cost as the maintenance system 108 follows established procedures to deal with detection of any error condition, including the error condition 118. Therefore, by avoiding the error condition 118 due to temporary icing, costs and labor associated with attempting to locate and correct a mechanical or electrical failure of the APU 170 can be avoided.

Although FIG. 1 illustrates particular examples for clarity of explanation, such examples are not to be considered as limitations. For example, although FIG. 1 depicts generating the prediction 112 prior to the aircraft 102 arriving at the destination airport 104, providing the flight crew, the maintenance crew, or both, with advance notice that the alternate APU startup procedure 116 is to be performed, in other implementations the prediction 112 can be generated upon the aircraft 102 arriving at the destination airport 104.

Although the data 110 is described as including the flight information 140, in other implementations the flight information 140 is not used to generate the prediction 112. For example, in some implementations the sensor data 120 and the weather forecast data 130 can be determined to provide sufficient information to accurately predict the error condition 118.

Although the machine learning device 106 and the aircraft 102 are depicted as separate components, in other implementations the machine learning device 106 can be integrated into the aircraft 102. For example, although having the machine learning device 106 as a dedicated system remote from the aircraft 102 enables the machine learning device 106 to operate as a central information hub with larger available computational resources and power consumption than may be available in an airplane-based system, in other implementations computations associated with generating the prediction 112 can be performed at the aircraft 102. In other implementations, the machine learning device 106 can be integrated in the maintenance system 108 or another system at the destination airport 104.

FIG. 2 illustrates a particular implementation 200 of components of the system 100 including the machine learning device 106. The machine learning device 106 is configured to receive the sensor data 120, the weather forecast data 130, and the flight information 140. The sensor data 120 includes data that is determined to be pertinent to predicting whether an error condition is likely to be encountered if the primary APU startup procedure 114 is performed, such as one or more of: an inlet duct temperature value 222; an outside temperature value 224; or an APU oil temperature value 226. The sensor data 120 can be collected for each of the flight phases 160A-160E to provide data indicating a time-evolution of sensor measurements over the duration of the flight 160.

The weather forecast data 130 includes data that is determined to be pertinent to predicting whether an error condition is likely to be encountered if the primary APU startup procedure 114 is performed. As illustrated, the weather forecast data 130 includes one or more of: a temperature estimate 232; a relative humidity estimate 234; a dew point estimate 236; or an altimeter pressure estimate 238 of the destination airport 104 at a scheduled or expected time of initiation of the primary APU startup procedure 114.

The flight information 140 includes one or more of: a flying time 242 associated with one or more flight phases 160 of travel to the destination airport 104; or timing values 244 of APU on/off events during one or more of, or each of, the flight phases 160. To illustrate, the flying time 242 can include an estimated time from departure from an origination airport to takeoff, an estimated time from departure to landing, an estimated time from landing to taxi at the destination airport 104, one or more other estimated or measured time, or any combination thereof. The flight information 140 can provide an indication of a "cold soak time" or length of time that the aircraft 102 is at the third phase 160C.

The machine learning device 106 includes a classifier 210 configured to generate the prediction 112. The classifier 210 can be generated based on results of a machine-learning procedure that can include providing training data to the machine learning device 106 to train a machine-learning model to accurately predict error conditions associated with sets of the training data. In some implementations, the machine learning model can include a random forest technique, a logistic regression technique, a support vector machine, a K-nearest neighbors technique, one or more other techniques, or any combination thereof. A cross-validation procedure, such as 10-fold cross-validation, can be performed to verify that the outcomes (e.g., predictions) of the machine learning model are reliable. In an example, input data sets that include flight information, sensor data, and weather forecast at the destination airport can be divided into training sets and test sets. The training sets are used to train the machine learning model, and the test sets are used for validation of the trained machine learning model.

Because occurrences of APU error conditions are rare, the input data sets can tend to be unbalanced. To illustrate, a representative sample of actual flights includes far more training sets that do not result in an error condition than training sets that do result in an error condition. Oversampling of the training sets that result in an error condition can be applied to balance training data.

Training the machine learning model can include tuning the model hyper-parameters and training the model using training data sets. After training the machine learning model, the testing data sets can be used to measure model performance. Analyzing the model performance can include determining accuracy, precision, and recall. Accuracy can be determined as area under a receiver operating characteristic (ROC) curve. Precision can be determined based on how many error conditions that were predicted were predicted correctly. Recall can be determined based on how many error conditions occurring in the testing data sets are predicted by the machine learning model.

In some implementations, the classifier 210 is configured to generate the prediction 112 as a selection 252 between: predicted unlikely to experience the error condition 118 associated with the primary APU startup procedure 114 and predicted likely to experience the error condition 118 associated with the primary APU startup procedure 114. In some implementations, the prediction 112, the message 154, or both, indicates a duration 254 of delay, after landing at the destination airport 104, after which the error condition 118 is unlikely to be experienced. The duration 254 can be a continuous value (e.g., a calculated duration) or a quantized value (e.g., selected from a first value indicating a 15-minute delay or a second value indicating a 30-minute delay). In some implementations, the prediction 112, the message 154, or both, indicates an error mode 256. For example, the error mode 256 can indicate a potential error location or error type predicted to occur. To illustrate, the error mode 256 can correspond to one or more components of the APU 170 or steps of a startup operation, as described further below.

In some implementations, the machine learning device 106 can generate an alert 258 that can be included in the message 154, sent to the aircraft 102 as an alert for the flight crew, or both. In some implementations, the machine learning device 106 can select from one or actions 260 to be included as a recommended action in the message 154. For example, the actions 260 can include waiting a first delay duration prior to starting the APU 170, waiting a second delay duration prior to starting the APU 170, performing one or more other actions to prevent or reduce a likelihood of the error condition 118, or a combination thereof.

The machine learning device 106 can be configured to generate the prediction 112 based on one or more APU components or phases of APU startup. In a particular implementation, to initiate start, an APU starter generator accelerates a rotating group of the APU 170 from rest to a speed where ignition is possible and provides assistance until the APU 170 becomes self-sustaining and accelerates to 100% speed. Acceleration of the rotating group is performed in a controlled manner to minimize turbine temperatures, avoid unstable aerodynamic conditions, and prevent airplane battery depletion. A general sequence of events during APU startup can include: (1) an engine control unit (ECU) receives a start signal from an APU master switch, (2) a start converter unit (SCU) receives a start enable signal from the ECU, (3) a start power unit (SPU) converts nominal three-phase, 400 Hertz (Hz), 115/200 volts alternating current (VAC) power (if available), or converts nominal 28 volts direct current (VDC) battery power to 270 VDC link power, (4) the SCU converts the DC link power (from the SPU) to regulated AC power for starter-generator motor operation, a starter generator (SG) exciter field is energized by the SCU, and a controlled voltage, current, and frequency is applied to a starter generator stator, and (6) when the APU 170 reaches 70% speed, the ECU removes the start enable signal to the SCU, de-energizing the starter generator. The SCU provides variable voltage, variable frequency power to the starter generator. The SCU utilizes rotor speed and position (resolver feedback) to provide maximum acceleration torque. This closed loop system provides positive APU acceleration control during the start cycle, and can automatically compensate for load changes.

In some implementations, the prediction 112 can include the error mode 256 that indicates one or more stages of APU startup (e.g., events 1-6 described above), one or more APU components (e.g., ECU, SCU, SPU, etc.), or any combination thereof. However, in other implementations, the prediction 112 can omit the error mode 256 and can instead include the selection 252, the duration 254 of delay, or both. In the various implementations, the prediction 112 enables generation of the message 154 to indicate that the error condition 118 is predicted to occur, that the alternate APU startup procedure 116 is to be used, or a combination thereof, so that occurrences of the error condition 118 can be reduced or eliminated.

FIG. 3 illustrates an example of a method 300 to predict a startup condition of an APU of an aircraft, such as the APU 170 of the aircraft 102. The method 300 can be performed at a machine learning device, such as the machine learning device 106.

The method 300 includes, at block 302, receiving, at a machine learning device, data including sensor data of the aircraft and weather forecast data of a destination airport. In an example, the sensor data 120 and the weather forecast data 130 are received at the machine learning device 106. In some implementations, the sensor data 120 includes one or more of: an inlet duct temperature value 222; an outside temperature value 224; or an APU oil temperature value 226. In some implementations, the weather forecast data 130 includes one or more of: a temperature estimate 232; a relative humidity estimate 234; a dew point estimate 236; or an altimeter pressure estimate 238. In some implementations, the received data further includes the flight information 140 of the aircraft 102. In an example, the flight information 140 includes one or more of the flying time 242 associated with one or more flight phases 160A-160E of travel to the destination airport 104 or timing values 244 of APU on/off events during one or more of the flight phases 160A-160E.

The method 300 includes, at block 304, processing, at the machine learning device, the data to generate a prediction regarding the startup condition. For example, the machine learning device 106 processes the data 110 and the weather forecast data 130 to generate the prediction 112 regarding the startup condition. In some implementations, processing the data 110 includes using the classifier 210 to generate the prediction 112. In an example, the prediction 112 is generated as a selection 252 between: predicted unlikely to experience the error condition 118 associated with the primary APU startup procedure 114, and predicted likely to experience the error condition 118 associated with the primary APU startup procedure 114.

The method 300 includes, at block 306, sending, to at least one of: the aircraft or a maintenance system at the destination airport, a message based on the prediction and recommending use of an alternate startup procedure of the APU to avoid an error condition associated with a primary startup procedure of the APU. In a particular implementation, the machine learning device 106 sends the message 154, via the transmitter 152, to at least one of the aircraft 102 or the maintenance system 108 at the destination airport 104, and the message 154 is based on the prediction 112 and recommends use of the alternate APU startup procedure 116 of the APU 170 to avoid the error condition 118 associated with the primary APU startup procedure 114. In another example, the message 154 indicates a duration 254 of delay, after landing at the destination airport 104, after which the error condition 118 is unlikely to be experienced.

By processing the data to generate the message, the flight crew of the aircraft or a ground crew at the destination airport can be notified that the alternate startup procedure for the APU is to be used instead of a primary startup procedure. As a result, an error condition that was predicted to occur upon performing the primary startup procedure can be avoided. Costs and delays associated with inspection, attempted repairs, and replacement of components of the APU can also be avoided.

FIG. 4 is a block diagram of a computing environment 400 including a computing device 410 configured to support aspects of computer-implemented methods and computer-executable program instructions (or code) according to the present disclosure. For example, the computing device 410, or portions thereof, is configured to execute instructions to initiate, perform, or control one or more operations described with reference to FIGS. 1-3. In some implementations, the computing device 410 includes components of the machine learning device 106. For example, the computing environment 400 can correspond to the system 100 of FIG. 1.

The computing device 410 includes one or more processors 420. The processor(s) 420 are configured to communicate with system memory 430, one or more storage devices 440, one or more input/output interfaces 450, one or more communications interfaces 460, or any combination thereof. The system memory 430 includes volatile memory devices (e.g., random access memory (RAM) devices), nonvolatile memory devices (e.g., read-only memory (ROM) devices, programmable read-only memory, and flash memory), or both. The system memory 430 stores an operating system 432, which may include a basic input/output system for booting the computing device 410 as well as a full operating system to enable the computing device 410 to interact with users, other programs, and other devices. The system memory 430 stores data 436, such as the sensor data 120, the weather forecast data 130, the flight information 140, or a combination thereof. The stored data 436 also includes training data 437 that can be used by a machine learning engine 435 to generate and update the classifier 210. For example, the training data 437 can include sensor data, flight information data, and weather forecast data associated with occurrences of APU startup error conditions and can be processed by the machine learning engine 435 to generate or train the classifier 210, such as in a random forest implementation, a logistic regression implementation, a support vector machine implementation, a k-nearest neighbors implementation, one or more implementations, or any combination thereof.

The system memory 430 includes one or more applications 434 (e.g., sets of instructions) executable by the processor(s) 420. As an example, the one or more applications 434 include instructions executable by the processor(s) 420 to initiate, control, or perform one or more operations described with reference to FIGS. 1-3. To illustrate, the one or more applications 434 include instructions executable by the processor(s) 420 to initiate, control, or perform one or more operations described with reference to the machine learning device 106, such as the classifier 210, the machine learning engine 435, or a combination thereof.

In a particular implementation, the system memory 430 includes a non-transitory, computer readable medium storing the instructions that, when executed by the processor(s) 420, cause the processor(s) 420 to initiate, perform, or control operations to predict a startup condition of an APU of an aircraft. The operations include receiving data including sensor data of the aircraft and weather forecast data of a destination airport and processing the data to generate a prediction regarding the startup condition. The operations also include sending, to at least one of: the aircraft or a maintenance system at the destination airport, a message based on the prediction and recommending use of an alternate startup procedure of the APU to avoid an error condition associated with a primary startup procedure of the APU.

The one or more storage devices 440 include nonvolatile storage devices, such as magnetic disks, optical disks, or flash memory devices. In a particular example, the storage devices 440 include both removable and non-removable memory devices. The storage devices 440 are configured to store an operating system, images of operating systems, applications (e.g., one or more of the applications 434), and program data (e.g., the program data 436). In a particular aspect, the system memory 430, the storage devices 440, or both, include tangible computer-readable media. In a particular aspect, one or more of the storage devices 440 are external to the computing device 410.

The one or more input/output interfaces 450 enable the computing device 410 to communicate with one or more input/output devices 470 to facilitate user interaction. For example, the one or more input/output interfaces 450 can include a display interface, an input interface, or both. The processor(s) 420 are configured to communicate with devices or controllers 480 via the one or more communications interfaces 460. For example, the one or more communications interfaces 460 can include a network interface. The devices or controllers 480 can include, for example, the receiver 150, the transmitter 152, one or more other devices, or any combination thereof.

In conjunction with the described systems and methods, an apparatus to predict a startup condition of an APU of an aircraft is disclosed that includes means for receiving data including sensor data of the aircraft and weather forecast data of a destination airport. In some implementations, the means for receiving data corresponds to the receiver 150, the machine learning device 106, the communications interface 460, the computing device 410, the processor(s) 420, one or more other circuits or devices configured to receive data including sensor data of the aircraft and weather forecast data of a destination airport, or a combination thereof.

The apparatus includes means for processing the data to generate a prediction regarding the startup condition. For example, the means for processing the data to generate a prediction can correspond to the machine learning device 106, the computing device 410, the processor(s) 420, one or more other devices configured to process the data to generate a prediction regarding the startup condition, or a combination thereof.

The apparatus includes means for sending, to at least one of: the aircraft or a maintenance system at the destination airport, a message based on the prediction and recommending use of an alternate startup procedure of the APU to avoid an error condition associated with a primary startup procedure of the APU. In some implementations, the means for sending the message corresponds to the transmitter 152, the machine learning device 106, the communications interface 460, the computing device 410, the processor(s) 420, one or more other circuits or devices configured to send, to at least one of: the aircraft or a maintenance system at the destination airport, a message based on the prediction and recommending use of an alternate startup procedure of the APU to avoid an error condition associated with a primary startup procedure of the APU.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-3. To illustrate, the instructions of the applications 434, when executed by the processor(s) 420, can cause the processor(s) 420 to initiate, perform, or control operations to predict a startup condition of an APU of an aircraft. The operations can include receiving data including sensor data of the aircraft and weather forecast data of a destination airport and processing the data to generate a prediction regarding the startup condition. The operations can also include sending, to at least one of: the aircraft or a maintenance system at the destination airport, a message based on the prediction and recommending use of an alternate startup procedure of the APU to avoid an error condition associated with a primary startup procedure of the APU. In some implementations, part or all of one or more of the operations or methods of FIGS. 1-3 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system to predict a startup condition of an auxiliary power unit of an aircraft, the system comprising:
   a machine learning device configured to:
      receive data including sensor data of the aircraft while the aircraft is in flight and weather forecast data of a destination airport;
      process the data to generate a prediction regarding the startup condition, wherein the prediction indicates an error condition associated with a primary startup procedure of the auxiliary power unit; and
      generate a message based on the prediction, the message causing an alternate startup procedure of the auxiliary power unit to be performed after the aircraft has landed at the destination airport to avoid the error condition.

2. The system of claim 1, wherein the machine learning device is configured to generate the prediction prior to an arrival of the aircraft at the destination airport.

3. The system of claim 1, further comprising:
   a receiver coupled to the machine learning device and configured to receive the sensor data and the weather forecast data; and
   a transmitter coupled to the machine learning device and configured to send the message to one or both of:
      the aircraft; or
      a maintenance system at the destination airport.

4. The system of claim 1, wherein the data further includes flight information of the aircraft.

5. The system of claim 4, wherein the flight information includes one or more of:
   a flying time associated with one or more flight phases of travel to the destination airport; or
   timing values of auxiliary power unit on/off events during one or more of the flight phases.

6. The system of claim 1, wherein the sensor data includes one or more of:
   an inlet duct temperature value;
   an outside temperature value; or
   an auxiliary power unit oil temperature value.

7. The system of claim 1, wherein the weather forecast data includes one or more of:
   a temperature estimate;
   a relative humidity estimate;
   a dew point estimate; or
   an altimeter pressure estimate.

8. The system of claim 1, wherein the machine learning device includes a classifier configured to generate the prediction.

9. The system of claim 8, wherein the classifier is configured to generate the prediction as a selection between:
   predicted unlikely to experience the error condition associated with the primary startup procedure; and
   predicted likely to experience the error condition associated with the primary startup procedure.

10. The system of claim 1, wherein the message indicates a duration of delay, after landing at the destination airport, after which the error condition is unlikely to be experienced.

11. A method to predict a startup condition of an auxiliary power unit of an aircraft, the method comprising:
   receiving, at a machine learning device, data including sensor data of the aircraft while the aircraft is in flight and weather forecast data of a destination airport;
   processing, at the machine learning device, the data to generate a prediction regarding the startup condition, wherein the prediction indicates an error condition associated with a primary startup procedure of the auxiliary power unit; and
   sending, to at least one of: the aircraft or a maintenance system at the destination airport, a message based on the prediction and causing an alternate startup procedure of the auxiliary power unit to be performed to avoid the error condition.

12. The method of claim 11, wherein the data further includes flight information of the aircraft.

13. The method of claim 12, wherein the flight information includes one or more of:
- a flying time associated with one or more flight phases of travel to the destination airport; or
- timing values of auxiliary power unit on/off events during one or more of the flight phases.

14. The method of claim 11, wherein the sensor data includes one or more of:
- an inlet duct temperature value;
- an outside temperature value; or
- an auxiliary power unit oil temperature value.

15. The method of claim 11, wherein the weather forecast data includes one or more of:
- a temperature estimate;
- a relative humidity estimate;
- a dew point estimate; or
- an altimeter pressure estimate.

16. A non-transitory, computer readable medium storing instructions that, when executed by a processor, cause the processor to initiate, perform, or control operations to predict a startup condition of an auxiliary power unit of an aircraft, the operations comprising:
- receiving data including sensor data of the aircraft while the aircraft is in flight and weather forecast data of a destination airport;
- processing the data to generate a prediction regarding the startup condition, wherein the prediction indicates an error condition associated with a primary startup procedure of the auxiliary power unit; and
- sending, to at least one of: the aircraft or a maintenance system at the destination airport, a message based on the prediction and causing an alternate startup procedure of the auxiliary power unit to be performed to avoid the error condition.

17. The non-transitory, computer readable medium of claim 16, wherein processing the data includes using a classifier to generate the prediction.

18. The non-transitory, computer readable medium of claim 17, wherein the prediction is generated as a selection between:
- predicted unlikely to experience the error condition associated with the primary startup procedure; and
- predicted likely to experience the error condition associated with the primary startup procedure.

19. The non-transitory, computer readable medium of claim 16, wherein the message indicates a duration of delay, after landing at the destination airport, after which the error condition is unlikely to be experienced.

20. The non-transitory, computer readable medium of claim 16, wherein the data further includes flight information of the aircraft.

* * * * *